United States Patent
de Azambuja Turtqueti et al.

(10) Patent No.: US 8,898,216 B2
(45) Date of Patent: Nov. 25, 2014

(54) DISTRIBUTED DATA ACQUISITION AND PROCESSING SYSTEM AND METHOD

(75) Inventors: Marcos de Azambuja Turtqueti, North Aurora, IL (US); Ryan Allen Rivera, North Aurora, IL (US); Jeffry L. Andresen, St. Charles, IL (US); John Chramowicz, Elgin, IL (US)

(73) Assignee: Fermi Research Alliance, LLC, Batavia, IL (US)

( * ) Notice: Subject to any disclaimer, the term of this patent is extended or adjusted under 35 U.S.C. 154(b) by 519 days.

(21) Appl. No.: 12/578,190

(22) Filed: Oct. 13, 2009

(65) Prior Publication Data

US 2011/0087720 A1 Apr. 14, 2011

(51) Int. Cl.
 G06F 15/16 (2006.01)
 G05B 23/02 (2006.01)
 G06F 13/00 (2006.01)
(52) U.S. Cl.
 CPC .............. *G05B 23/02* (2013.01); *G06F 13/00* (2013.01)
 USPC .......................... 709/201; 709/202; 709/208
(58) Field of Classification Search
 USPC .......... 709/201, 202, 208; 710/8, 62, 72, 104
 See application file for complete search history.

(56) References Cited

U.S. PATENT DOCUMENTS

| | | | |
|---|---|---|---|
| 5,475,867 A | 12/1995 | Blum | 455/53.1 |
| 6,259,745 B1 | 7/2001 | Chan | 375/285 |
| 6,366,557 B1 | 4/2002 | Hunter | 370/217 |
| 6,731,691 B2 | 5/2004 | Agazzi et al. | 375/285 |
| 6,735,630 B1 | 5/2004 | Gelvin et al. | 709/224 |
| 7,376,760 B1 * | 5/2008 | Ivchenko et al. | 710/8 |
| 2003/0040881 A1 * | 2/2003 | Steger et al. | 702/123 |
| 2007/0297443 A1 | 12/2007 | Bowers et al. | 370/463 |
| 2009/0240472 A1 * | 9/2009 | Winnebeck et al. | 702/184 |
| 2011/0054721 A1 * | 3/2011 | Goodrich et al. | 701/14 |

* cited by examiner

*Primary Examiner* — Liangche A Wang
*Assistant Examiner* — Cheikh Ndiaye
(74) *Attorney, Agent, or Firm* — Luis M. Ortiz; Kermit D. Lopez; Ortiz & Lopez, PLLC

(57) ABSTRACT

A data acquisition and processing system and method includes one or more distributed and expandable data acquisition nodes for processing large amounts of data. Each data acquisition node includes a core group of primary boards electronically connected together via a vertical bus capable of providing intra-node communication between the primary boards. A secondary board horizontally connected in association with the primary board via a horizontal bus provides inter-node communication or instrumentation interfaces to sensors or other application specific instruments. A master control unit associated with a graphical user interface communicates with the data acquisition nodes via a communication protocol to permit high speed exchange of information and to display information reported from the acquisition system. A storage controller associated with a node controller controls storage of data associated with the data acquisition nodes on a database in a remote location.

12 Claims, 9 Drawing Sheets

DISTRIBUTED DATA ACQUISITION AND PROCESSING SYSTEM AND METHOD

TECHNICAL FIELD

Embodiments are generally related to data-processing systems and methods. Embodiments also relate in general to the field of computers and similar technologies, and in particular to software utilized in this field. In addition, embodiments relate to data acquisition systems.

BACKGROUND OF THE INVENTION

Electronic systems often require that information concerning an event be gathered, stored, manipulated, and analyzed. Data acquisition involves the sampling of "real world" information to generate data that can be manipulated by a data-processing apparatus, such as a computer. Data acquisition generally includes acquisition of signals and waveforms, and the processing of such signals to obtain desired information. Components associated with a data acquisition system generally include appropriate sensors for converting measurement parameters to electrical signals, and a mechanism for conditioning the electrical signals, which can be then acquired by data acquisition hardware. Acquired data may be displayed, analyzed, and stored via a computer utilizing appropriate software applications.

The installation of conventional data acquisition systems, however, is a costly and time consuming endeavor, and is not retroactively compatible with earlier developments.

Based on the foregoing, it is believed that a need exists for an improved distributed data acquisition and processing system. A need also exists for a compact and programmable data acquisition node for high energy physics applications, as described in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved data-processing methods and systems.

It is another aspect of the disclosed embodiments to provide for an improved distributed data acquisition and processing method and system.

It is a further aspect of the disclosed embodiments to provide for an improved compact and programmable data acquisition node.

The aforementioned aspects and other objectives and advantages can now be achieved as described herein. A data acquisition and processing system including one or more data acquisition nodes is disclosed for processing large amounts of data. Each data acquisition node includes a core group of primary boards connected together via a vertical bus capable of providing intra-node communication between the primary boards. A secondary board (e.g., gigabit Ethernet board) horizontally connected in association with the primary board via a horizontal bus provides inter-node communication. The secondary board may also provide hardware interfaces to specific sensors and other instrumentation as needed by individual applications. A master control unit associated with a graphical user interface communicates with the data acquisition nodes via a communication protocol (e.g., universal datagram protocol of the Internet protocol (UDP/IP), USB or Firewire) to permit high speed exchange of information and to display information reported from the acquisition nodes. A node controller may be engaged to provide communication between the data acquisition nodes and the global master unit.

A storage controller associated with the node controller controls storage of data associated with the data acquisition nodes on a database in a remote location. The GUI may be employed to send control commands, manipulate configurations and view real-time data to gauge status of the detectors. Each board associated with the core group of primary boards in the same node possesses access to the vertical bus and is therefore accessible to each other. The vertical bus includes a data bus, a system bus and a data power bus. The horizontal bus also known as secondary bus is a board level channel of communication which interfaces the data acquisition node with peripherals. An optical bus associated with the data acquisition node can be employed for in node open air communication or plastic optical fiber (POF) communication.

The primary core boards associated with the vertical bus include a node processing and control board (NPCB), a data conversion board (DCB), power electronics board (PEB) and a mass memory board (MMB). The node processing and control board processes information acquired by the system and forward the information to another node or a data-processing system. The data conversion board includes one or more analog to digital converters (ADCs) and digital to analog converters (DACs) which may be employed for data acquisition. The power electronics board provides regulated power supply for the power lines associated with the power bus. The mass memory board provides a high speed local mass memory with respect to the system. The secondary board connected to the horizontal bus includes the gigabit Ethernet board and is considered a core board that provides gigabit communication between the nodes and/or between the node and the data processing system. The data acquisition node may include user boards based on requirements associated with the system. The user boards may be either a primary board and/or a secondary board.

The GUI may be employed as an access point for users to the control and acquisition features associated with the system. The GUI may either be a stand-alone application (e.g., TCP/IP) or a web based application (e.g., HTTP) to communicate with the master control unit. The software implementation provides the user an option to maintain the same controls, acquisition, and analysis from a single unit test stand to final system production. The data acquisition system provides multi-process and distributed computing techniques. The system can handle multiple data acquisition nodes, each producing gigabits of data per second, thereby providing an option to employ distributed computing for data acquisition network topologies involving large amounts of data.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
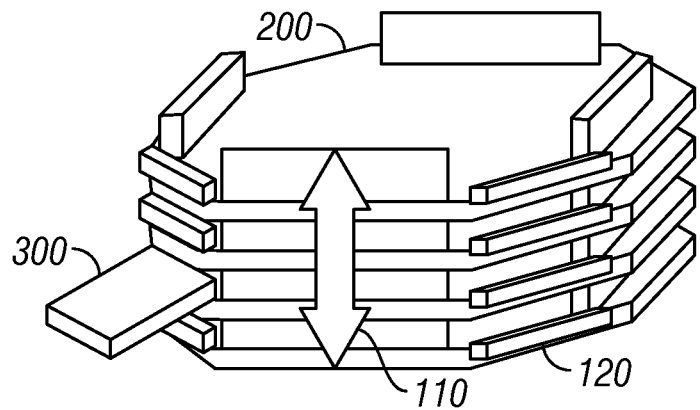
FIG. 1 illustrates a schematic view of compact and programmable data acquisition node (CAPTAN), in accordance with the disclosed embodiments.

FIG. 1 illustrates a schematic view of a CAPTAN (Compact and Programmable Data Acquisition Node) 100, in accordance with the disclosed embodiments. The data acquisition and processing node 100 (also referred to simply as a "data acquisition node") can be employed in a variety of applications (e.g., pixel and strip detectors associated with high energy physics applications). The most important characteristics of the data acquisition node 100 include its flexibility, versatility and scalability. The data acquisition node 100 generally includes a core group of one or more primary boards 200 electronically connected to one another via a vertical bus 110. The data acquisition node 100 further includes a secondary board 300 (e.g., gigabit Ethernet link) horizontally connected in association with the primary board via a horizontal bus 120. The data acquisition node 100 generally supports two types of data paths, an intra-node path and an inter-node data path. Intra-node communication may be achieved via the vertical bus 110, which connects the entire core group of primary board(s) 200 in the same node. Inter-node communications is realized by two different electronic communications paths—the horizontal bus 120 and the secondary board 300. Note that the secondary board 300 may also provide hardware interfaces to specific sensors and other instrumentation as needed by individual applications.

The primary boards 200 represent the backbone of the node 100 and form a part of the central part of the hardware of node 100. Note that the data acquisition node 100 may be configured utilizing a single primary board 200 and a secondary board 300, depending upon design considerations. The data acquisition node 100 may also be configured by stacking multiple primary boards 200 to expand the capabilities of the data acquisition node 100. The node 100 is generally capable of handling both analog and digital information. Depending on the number of primary boards 200 in the stack, up to 10 secondary boards 300 can provide networking access to the multiple boards associated with the node. A distributed system with multiple data acquisition node(s) 100 can be configured utilizing the Ethernet capabilities of such nodes. That is, although a single node 100 is depicted in FIG. 1, it can be appreciated that multiple nodes may be linked to one another as a part of an overall system umbrella. Note that there is no limit in the number of node(s) 100 that may be interconnected to one another, thereby making it possible for such a configuration to handle very large amounts of data at extremely high speeds.

Figure 2:
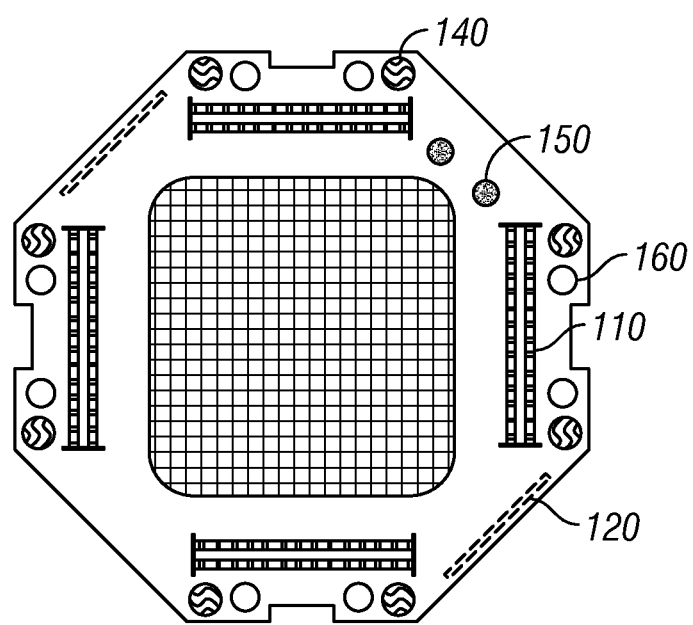
FIG. 2 illustrates a schematic view of a data acquisition core board, in accordance with the disclosed embodiments.

FIG. 2 illustrates a schematic view of a data acquisition core primary board 200, in accordance with the disclosed embodiments. Note that in FIGS. 1-15, identical or similar parts or elements are generally indicated by identical reference numerals. The data acquisition core primary board 200 includes the vertical bus 110, the horizontal bus 120, an optical bus 150, a cooling channel 140, mounting holes 160 and an electronic pack 130, One or more data acquisition core primary board(s) 200 may be connected via the vertical bus 110 and can share data and power through the vertical bus 110. The vertical bus 110 may be physically divided into four connectors, and can include, for example, 4×64 pins, 4×16 pins and 4×10 pins. The main task of the vertical bus 110 is to flow data within the data acquisition core primary board 200.

The horizontal bus 120 can function as a local bus connected to electronics 130 that are associated with the secondary board 300. The horizontal bus 120 generally supports the connection of the secondary board 300 and may collect data or provide electronic signal conditioning. The horizontal bus 120 may also be employed for node-to-node communication, either directly or indirectly through a secondary card that bridges two or more nodes. The configuration associated with the horizontal bus 120 may vary, but the baseline for the digital boards preferably includes the use of 32 pins for data communications (e.g., differential or single ended), 12 pins for control signals, clocks and two power supplies. The horizontal bus 120 permits analog lines for input or output and cannot access directly the vertical bus 110 and therefore it is not subjected to the restrictions imposed by data formatting associated with the vertical bus 110.

The optical bus 150 represents an extension to the vertical bus 110 and is capable of providing direct intra-node connections. The optical bus 150 can be implemented as a bi-directional system of high speed lasers for open-air communications. The optical bus 150 is capable of transferring information up to, for example, 1Gbps and in a serial manner regardless of the location of the primary board 200 and the number of boards on the node 100. The optical bus 150 can provide open-air stack communications. The optical bus 150 can also be placed in specific locations on the primary board 200 to repeat the aforementioned laser signal while functioning as a physical window for the laser to pass.

Figure 3:
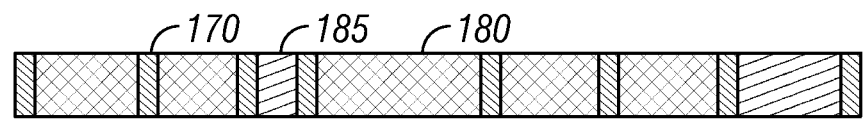
FIG. 3 illustrates a schematic view of a vertical bus associated with the data acquisition node, in accordance with the disclosed embodiments.

The primary board 200 associated with the vertical bus 110 generally includes a node processing and control board (NPCB) 400 (see FIG. 4), a data conversion board (DCB) 425, (see FIG. 5), power electronics board (PEB) and a mass memory board (MMB). The secondary board 300 connected to the horizontal bus 120 includes a gigabit Ethernet link (GEL) and is considered a core board. The system further includes user boards that are custom made boards that follow the requirements with respect to the system architecture. The user boards can be either the primary board 200 or the secondary board 300. The data acquisition node 100 may be interfaced with a global master control unit 710 (see FIG. 10) via a communication protocol. Note that communication protocol may constitute, for example, universal datagram protocol of the Internet protocol (UDP/IP), USB and/or Firewire, depending upon design considerations, FIG. 3 illustrates a schematic view of the vertical bus 110 associated with the data acquisition core board 200, in accordance with the disclosed embodiments. The primary board 200 associated with the node 100 communicates directly with another board in the same node via the vertical bus 110. The vertical bus 110 generally includes a data bus 180, a system bus 185 and a data power bus 170. The vertical bus 110 may include 12 independent data bus 180 (e.g., four with 64 pins, another four with 16 pins and finally, four with 10 pins). The data bus 180 includes formatted data that run on the vertical bus 110 and data that arrives from the horizontal bus 120 which doesn't have a particular format. The data bus 180 may be provided for the user to exchange massive amounts of data. The data bus 180 can be configured in two modes a single mode can deliver 360 bits per clock cycle and a differential configuration can deliver 180 bits per clock cycle.

The system bus 185 carries messages within the node 100 regarding the status of the data bus 180, ensuring that access to each bus is granted safely. Priorities and policies governing the bus access may be specified on a system bus controller, a firmware block resident associated with the NPCB board 400. The system bus 185 may be divided into a system control bus and a system SPI bus. The system control bus is responsible for implementing the primary task associated with the system bus 185. The system SPI bus may be employed to distribute firmware required to configure programmable logic devices on boards belonging to the same stack, The firmware for such devices is delivered from the NPCB board 400 where the SPI bus controller is implemented, Other signals on the system control bus include a reference clock and the node hardware reset signal. The system bus 185 possesses a number of pins reserved to accommodate the growth of the architecture.

The power bus 170 provides power for the node 100 and makes power available for the horizontal bus 120. Power is also distributed to the data acquisition node 100 over the same connectors providing 3.3V (12pins), 5.0V (12pins), 12.0V (4pins) and -12V (4pins) for the entire node. The design of the four buses reflects a high degree of symmetry making the rotational orientation in a stack largely unimportant. The primary boards 200 may be added to the node 100 in one of four different orientations. Such an approach provides a means to make the best use of board resources in a stack without limitations imposed by the presence of other boards in the stack.

Figure 4:
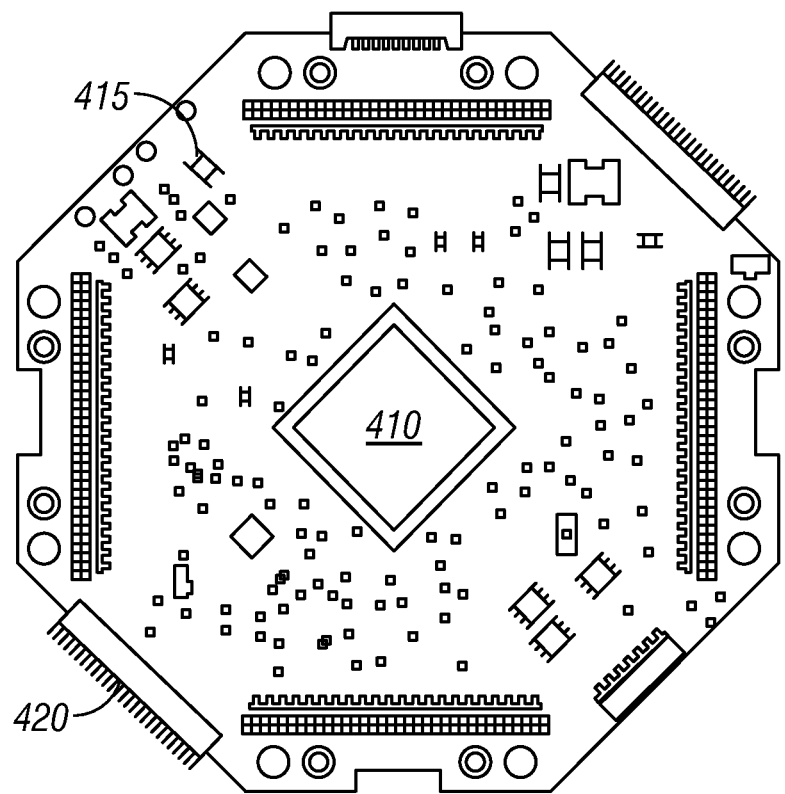
FIG. 4 illustrates a schematic view of a node processing and control board, in accordance with the disclosed embodiments.

FIG. 4 illustrates a schematic view of the node processing and control board 400, in accordance with the disclosed embodiments. The NPCB 400 is a primary board 200 that processes information collected by the node 100 and/or forwards the information to another node or a data-processing system 500. (see FIG. 7), The NPCB board 400 can handle information from the data buses 180 as well as the system buses 185 and 190. The node 100 generally includes a single NPCB board 400 that is responsible for driving the system bus 185. The NPCB board 400 may include two local buses. One is a high speed local bus typically connected to the secondary board 300. The high speed local bus can be employed as a general purpose bus. The other secondary bus is a 32 bits single-ended or 16 bits differential general use local bus.

The NPCB board 400 also provides a gigabit open-air communication link 420 and an intra-stack optical link 415. The primary component of the NPCB board 400 is a Virtex-4 field programmable gate array (FPGA) 410. Note that different versions of the FPGA 410 may be supported by the NPCB board 400 including the FX12 series devices that possess an embedded power PC core. When stacking the NPCB board 400 there is a trade off between maximum speed on the vertical bus 110 and maximum number of primary boards 200. Note that Table 1 herein illustrates the maximum bus clock speed obtained experimentally with one node (configured with different numbers of boards) for which no errors are observed in the intra-node communications on the vertical bus 110. The vertical bus 110 is tested in a loopback configuration in both single-ended and differential modes. When in differential mode these values are experimentally obtained with double termination with the exception of a two boards stack.

TABLE 1

| NUMBER OF BOARDS ON THE NODE | MAXIMUM VERTICAL BUS CLOCK SPEED IN MHz (SINGLE) | MAXIMUM VERTICAL BUS CLOCK SPEED IN MHz (DIFFERENTIAL) |
| --- | --- | --- |
| 2 | 200 | 340 |
| 3 | 150 | 280 |
| 4 | 120 | 240 |
| 5 | 80 | 200 |
| 6 | 66 | 150 |
| 7 | 33 | 125 |
| 8 | — | 100 |
| 9 | — | 66 |
| 10 | — | 33 |

Figure 5:
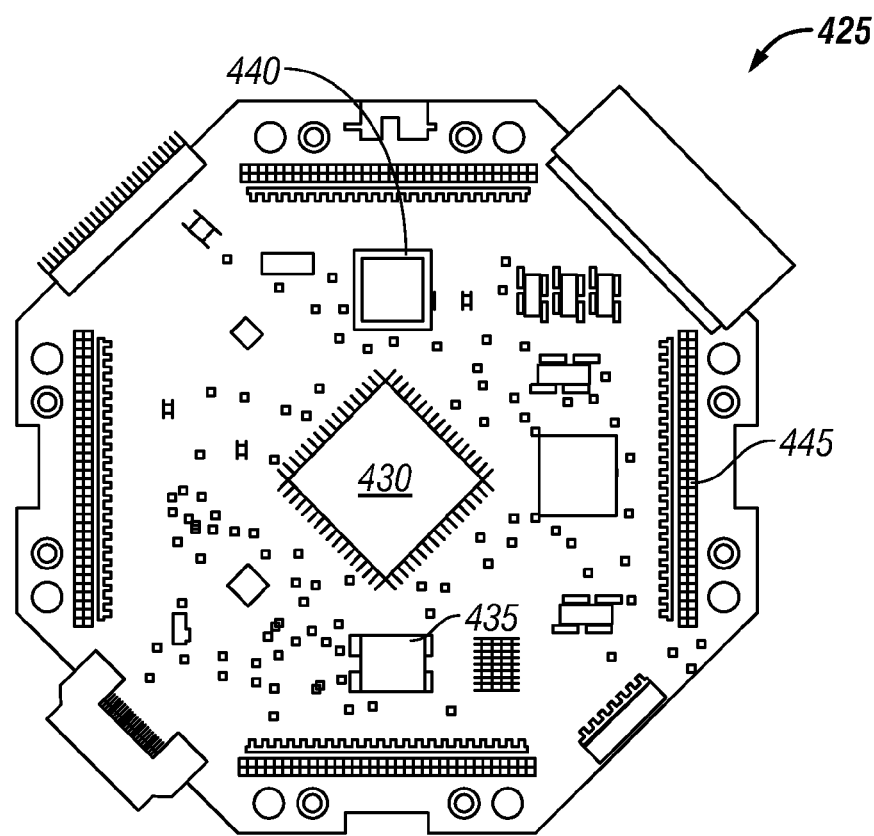
FIG. 5 illustrates a schematic view of a data conversion board, in accordance with the disclosed embodiments.

FIG. 5 illustrates a schematic view of the data conversion board 425, in accordance with the disclosed embodiments. The DCB board 425 is the primary system board utilized for data acquisition. The board 425 may include one or more analog to digital converters (ADCs) 430, digital to analog converters (DACs) 435 and amplifiers 440. For example, the board 425 may include three different ADCs, providing varying conversion speeds (1 Gsps (fast ADC), 65 Msps (medium speed ADC), and 300 Ksps (slow ADC) respectively). The medium speed ADC hardware includes an operational amplifier in each channel, where gain and offset can be adjusted digitally. Table 2 illustrates summary of the analog to digital converter capabilities associated with the DCB board 425.

TABLE 2

| ADC TYPE | # OF CHANNELS | RANGE | MAX CURRENT |
| --- | --- | --- | --- |
| ULTRAFAST | 2 | 8 bits | 1.6 Gsps |
| MEDIUM | 8 | 12 bits | 65 Msps |
| SLOW | 12 | 12 bits | 0.3 Msps |

The DCB board may include two DACs, one fast DAC (e.g., 500Msps) and one slow DAC (e.g., 0.3Msps). A summary of the capabilities of the DACs associated with the DCB board is presented in Table 3 below.

TABLE 3

| DAC TYPE | # OF CHANNELS | RESOLUTION | MAX CURRENT |
| --- | --- | --- | --- |
| FAST | 2 | 12 bits | 500 Msps |
| SLOW | 32 | 16 bits | 0.3 Msps |

The ADCs 430 and DACs 435 may be accessed via three lateral connectors 445 on the board 425, with exception of the fast ADC that has special dedicated coaxial connectors. The board 425 also provides a bridge to the vertical bus 110 through a fourth lateral connector. The bridge is capable of level translation and is meant to provide access to the vertical bus 110 to external peripherals. In addition to the above features, the DCB 425 also provides five adjustable regulated voltages through the lateral connectors.

The power electronics board (not shown) is a primary board 200 that provides regulated power supply for the four power lines associated with the power bus 170. The power board provides regulated monitored power and protection to the bus 170. For example, the power board provides 8 insulated gate bipolar transistor (IGBT) high power drives and 8 metal-oxide-semiconductor field-effect transistor (MOSFET) medium power drivers in order to control external devices that require high current switching capability. The board can provide a maximum combined power of 150W to the vertical bus 110 and additional 20 W for the onboard switches. The mass memory board (not shown) is a primary board 200 that provides for example, up to 1GByte of double data rate synchronous dynamic random access memory (DDR2). The board provides a high speed local mass memory to the data acquisition node 100. The design of the board supports standard small outline dual in-line memory module (SO-DIMM) DDR2 memory cards and every card is connected to a carrier data acquisition node that is connected directly to the 64 bits bus while operating in single ended mode low voltage transistor-transistor logic (LVTTL) 3.3V.

Figure 6:
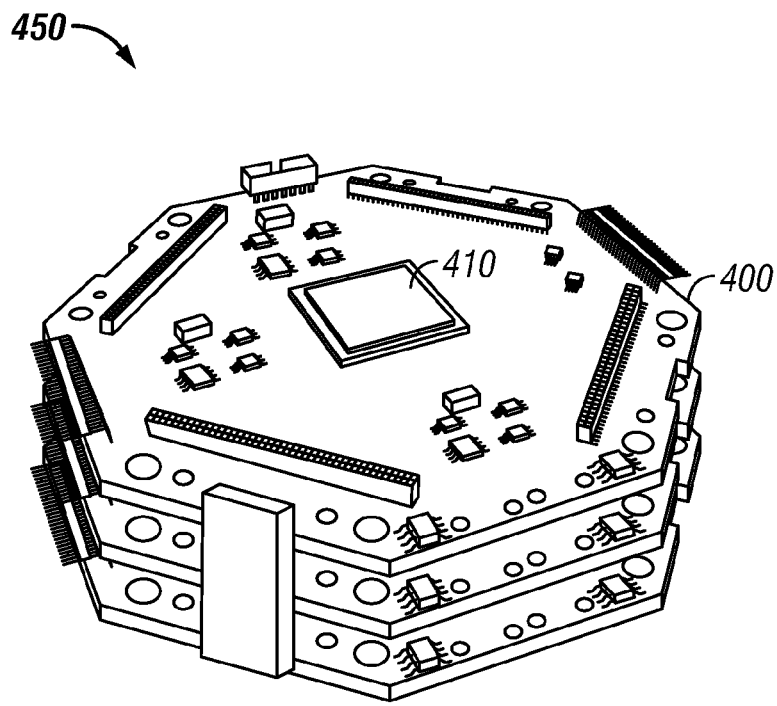
FIG. 6 illustrates a schematic view of the data acquisition node configured with three node processing and control board, in accordance with the disclosed embodiments.

FIG. 6 illustrates a schematic view of the data acquisition node 100 configured with three node processing and control board 400, in accordance with the disclosed embodiments. The gigabit Ethernet secondary board 300 is a secondary board providing gigabit communication between nodes or between a node and the data-processing system 500. The board 300 is the main external interface of the data acquisition node system 100 and can communicate directly with any data-processing system 500. The board 300 may be designed to work with Ethernet protocol 10/100/1000 and to utilize UDP/IP as the communication protocol. The board 300 may be connected using the IEEE 802.3ab (1000BASE-X) protocol and can transmit pure user data at this speed due to the addition of several layers of protocol, maximum packet size limitations and the particular hardware employed.

The board 300 can transmit pure user data up to 800 Mbps utilizing the UDP protocol with the packet size set to 1466 bytes with the PHY running 1000BASE-X, The power consumption of the GEL board 300 may be 1.25W. The NPCB 400 associated with the node 100 may support the GEL board 300. The GEL board 300 may interface with the node through the NPCB 400 and the FPGA 410 firmware must include the gigabit Ethernet controller firmware. The user needs to comply with the vertical bus 110 communication and electrical rules in order to design the primary board 200. For example, the primary board 200 may include buffers to isolate itself from the vertical bus 110. The power limits must be obeyed (the board cannot consume more than 12W of power) and the mechanical rules for the primary board 200 must be followed, which may guarantee that the cooling channel 140, optical bus 150 and bus interfaces match the existing system.

Figure 7:
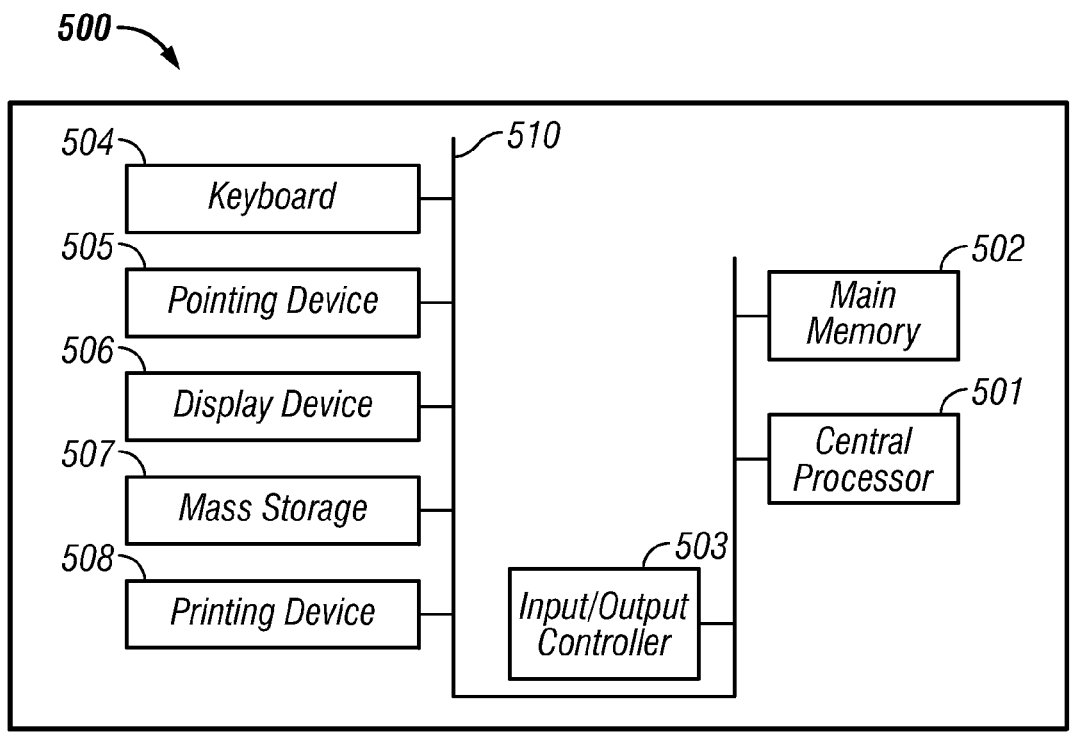
FIG. 7 illustrates a schematic view of a data-processing system in which an embodiment may be implemented.
Figure 8:
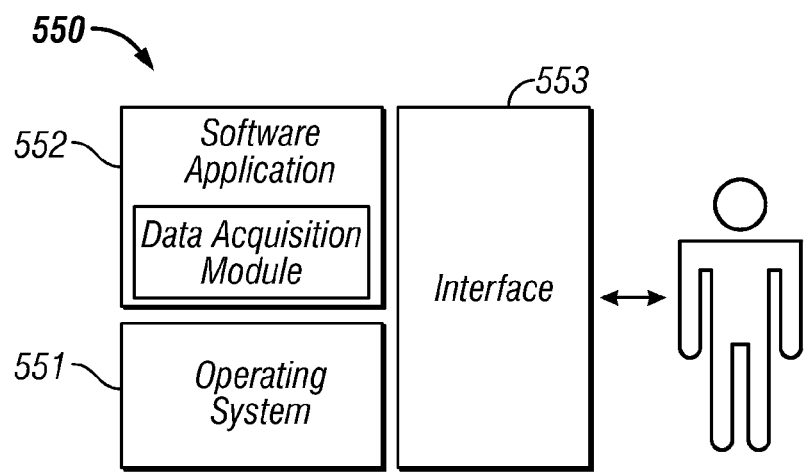
FIG. 8 illustrates a schematic view of a software system including an operating system, application software, and a user interface for carrying out an embodiment.
Figure 9:
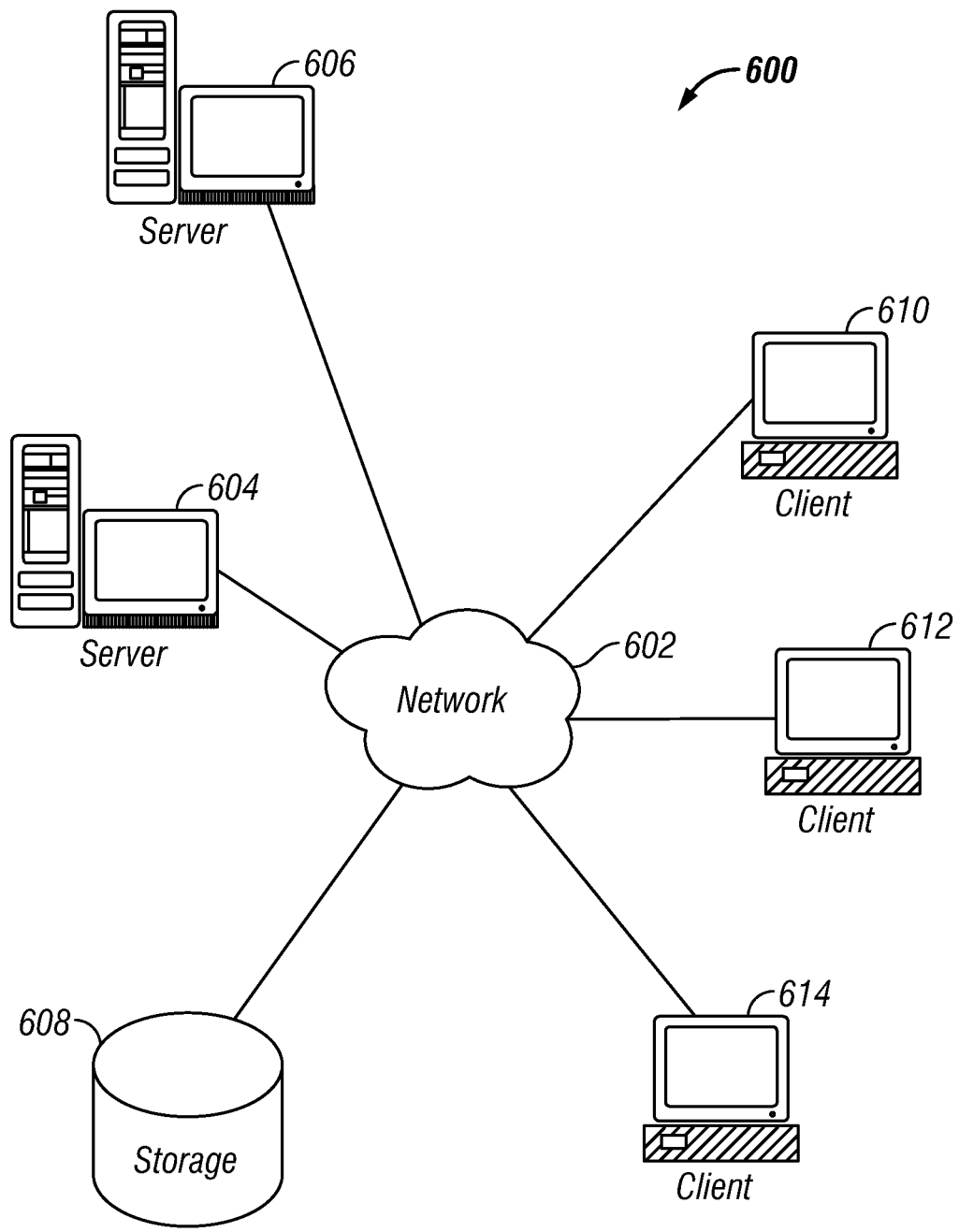
FIG. 9 illustrates a graphical representation of a network of data-processing systems in which aspects of the disclosed embodiments may be implemented.

FIGS. 7-9 are provided as exemplary diagrams of data-processing environments in which embodiments of the present invention may be implemented. It should be appreciated that FIGS. 7-9 are only exemplary and are not intended to assert or imply any limitation with regard to the environments in which aspects or embodiments of the disclosed embodiments may be implemented. Many modifications to the depicted environments may be made without departing from the spirit and scope of the present invention.

As illustrated in FIG. 7, the disclosed embodiments may be implemented in the context of the data-processing system 500 comprising, for example, a central processor 501, a main memory 502, an input/output controller 503, a keyboard 504, a pointing device 505 (e.g., mouse, track ball, pen device, or the like), a display device 506, and a mass storage 507 (e.g., hard disk). Additional input/output devices, such as a rendering device 508 (e.g., printer, scanner, fax machine, etc), for example, may be associated with the data-processing system 500 as desired, As illustrated, the various components of data-processing system 500 communicate electronically through a system bus 510 or similar architecture. A system bus 510 may be a subsystem that transfers data between, for example, computer components within data-processing system 500 or to and from other data-processing devices, components, computers, etc.

FIG. 8 illustrates a computer software system 550 for directing the operation of the data-processing system 500 depicted in FIG. 7. Software application 552, stored in main memory 502 and on mass storage 507, generally includes a kernel or operating system 551 and a shell or interface 553. One or more application programs, such as software application 552, may be "loaded" (i.e., transferred from mass storage 507 into the main memory 502) for execution by the data-processing system 500. The data-processing system 500 receives user commands and data through user interface 553; these inputs may then be acted upon by the data-processing system 500 in accordance with instructions from operating module 551 and/or software application 552.

The following discussion is intended to provide a brief, general description of suitable computing environments in which the system and method may be implemented. Although not required, the disclosed embodiments will be described in the general context of computer-executable instructions, such as program modules, being executed by a single computer.

Generally, program modules include but are not limited to routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc. Such a module may also constitute a software application such as a "plug-in". Note that the term plug-in as utilized herein refers generally to a computer program that interacts with a host application (e.g., a Web browser) to provide a certain, usually very specific, function "on demand". The terms "plug-in" and "plug-in module" and "module" may be utilized interchangeably to refer to the same component or application.

The interface 553, which is preferably a graphical user interface (GUI), can serve to display results, whereupon a user may supply additional inputs or terminate a particular session. In some embodiments, operating system 551 and interface 553 can be implemented in the context of a "Windows" system. It can be appreciated, of course, that other types of systems are potential. For example, rather than a traditional "Windows" system, other operation systems, such as, for example, Linux may also be employed with respect to operating system 551 and interface 553. The software application 552 can include a data acquisition module for interfacing with a network of compact and programmable data acquisition nodes. The data acquisition module facilitates changes to the user interface 553 to configure, control, and interpret readout chips that are not known a priori. Software application module 552, on the other hand, can include instructions, such as the various operations described herein with respect to the various components and modules described herein.

FIG. 9 depicts a graphical representation of a network of data-processing systems in which aspects of the disclosed embodiments may be implemented. Network data-processing system 600 is a network of computers in which embodiments of the present invention may be implemented. Network data-processing system 600 contains network 602, which is the medium used to provide communications links between various devices and computers connected together within network data-processing apparatus 600. Network 602 may include connections, such as wire, wireless communication links, or fiber optic cables.

In the depicted example, server 604 and server 606 connect to network 602 along with storage unit 608. In addition, clients 610, 612, and 614 connect to network 602. These clients 610, 612, and 614 may be, for example, personal computers or network computers. Data-processing system 500 depicted in FIG. 7 can be, for example, a client such as client 610, 612, and/or 614. Alternatively, data-processing system 500 can be implemented as a server, such as servers 604 and/or 606, depending upon design considerations.

In the depicted example, server 604 provides data, such as boot files, operating system images, and applications to clients 610, 612, and 614. Clients 610, 612, and 614 are clients to server 604 in this example. Network data-processing system 600 may include additional servers, clients, and other devices not shown. Specifically, clients may connect to any member of a network of servers which provide equivalent content.

In the depicted example, network data-processing system 600 is the Internet with network 602 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data-processing system 600 also may be implemented as a number of different types of networks, such as for example, an intranet, a local area network (LAN), or a wide area network (WAN). FIG. 7 is intended as an example, and not as an architectural limitation for varying embodiments of the present invention.

The description herein is presented with respect to particular embodiments of the present invention, which may be embodied in the context of a data-processing system, such as, for example, data-processing system 500 and computer software system 550 illustrated with respect to FIGS. 7-9. Such embodiments, however, are not limited to any particular application or any particular computing or data-processing environment. Instead, those skilled in the art will appreciate that the disclosed system and method may be advantageously applied to a variety of system and application software. Moreover, the present invention may be embodied on a variety of different computing platforms, including Macintosh, UNIX, LINUX, and the like.

Figure 10:
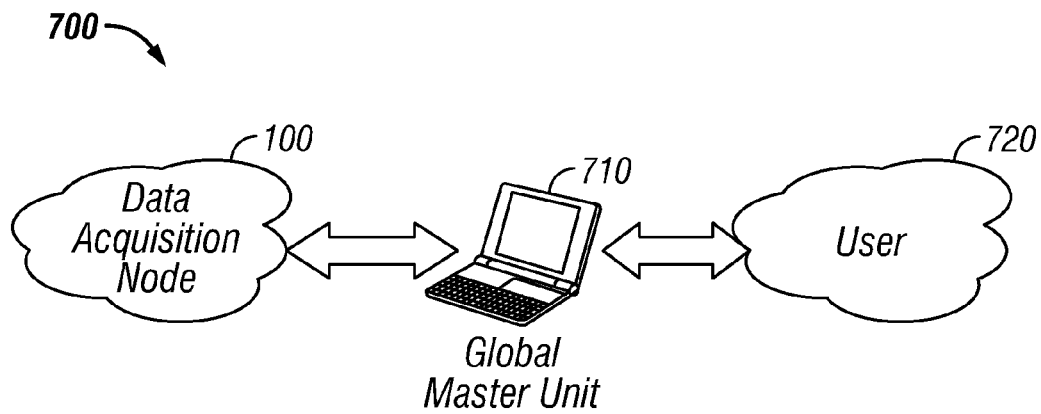
FIGS. 10-12 illustrate block diagram of a data acquisition software system associated with the data acquisition node, in accordance with the disclosed embodiments.
Figure 11:
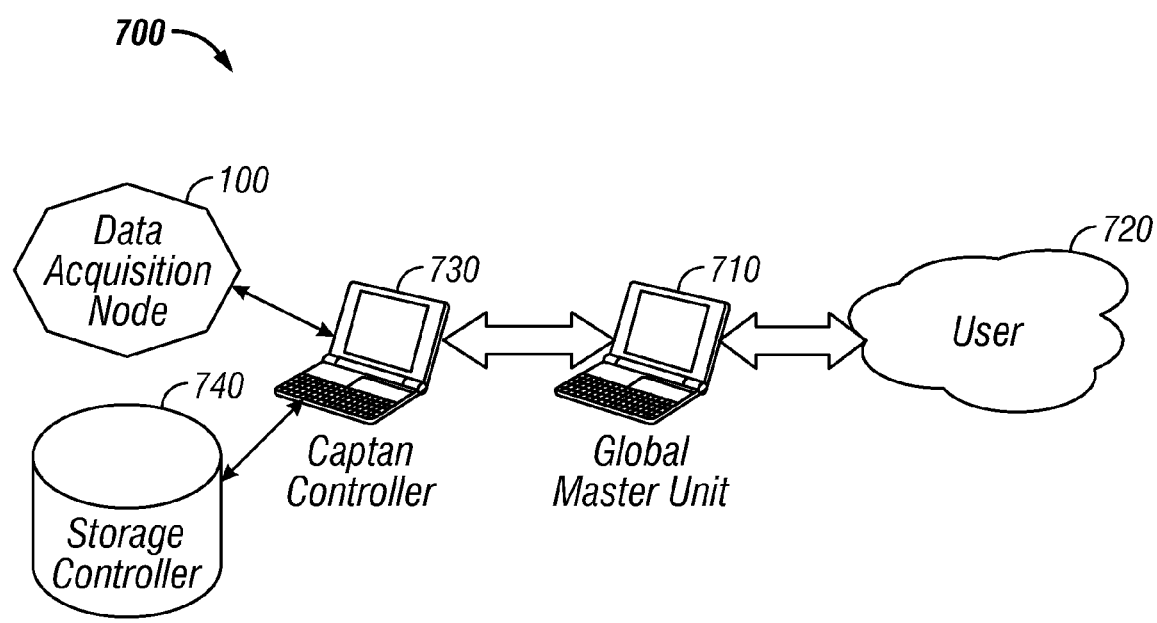
Figure 12:
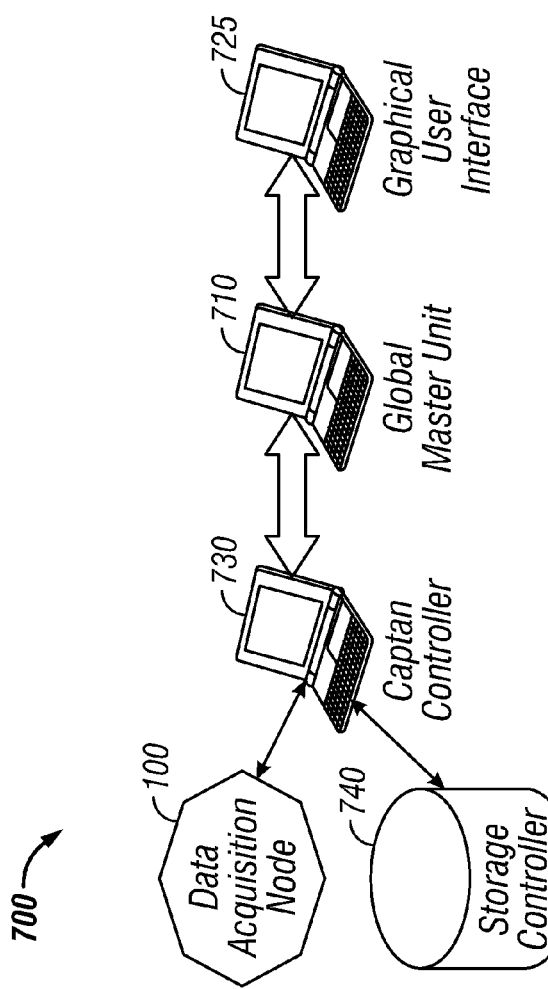

FIGS. 10-12 illustrate block diagram of a data acquisition software system 700 associated with the data acquisition node 100, in accordance with the disclosed embodiments. Again as reminder, in FIGS. 1-15, identical or similar blocks are generally indicated by identical reference numerals. The data acquisition software system 700 generally includes a global master control unit 710, a data acquisition node controller 730, a storage controller 740, and a user interface 725. The communication between the users 720 and the data acquisition node 100 flow through the global master unit 710. The master control unit 710 manages message forwarding, system security, system resources, and the roles of components within the system 700. The master control unit 710 maintains a list of blocks that are connected to the system 700. The TCP/IP connection list provides the master control unit 710 accesses to any application at any time thus allowing it to forward messages throughout the network. The global master unit 710 is responsible for validating handshakes between prospective connections. Note that the global master unit 710 and the controller 730 are similar and analogous to the data-processing system 500 depicted in FIG. 7.

The data acquisition node controller 730 provides communication between the global master unit 710 and the data acquisition node 100. The controller 730 is in control of a single data acquisition node 100 and some amount of permanent storage associated with a storage controller 740. The controller 730 receives messages from the global master unit 710 which is destined for the data acquisition node 100. The controller 730 forward messages to the data acquisition node 100 and the data that is returned from the data acquisition node 100 is either stored to the storage 608 or sent to the global master unit 710.

The controller 730 handles the highest data throughput because the raw data from the data acquisition node gigabit Ethernet link secondary board 300 runs through a single socket controlled by the controller 730. The controller 730 creates two threads. One thread is dedicated to receiving data from the data acquisition node 100 and storing it to the shared memory. The other thread handles the communication between the global master unit 710 and, when required, forwards commands to the data acquisition node 100. If the controller 730 is configured to store data to the storage controller 740, a third thread may be created with the sole responsibility of streaming out the shared memory to permanent files on the storage 608. The storage controller 740 may be employed to save data to the storage 608 that is in a different physical location from that of the data acquisition node 100 connection to the controller 730.

The storage 608 tag and store data from the data acquisition node 100 forwarded from the subnet master 755. The data acquisition module included in software application 552 can be employed to automatically configure a graphical display 725 (e.g., a GUI) to display data indicative of information reported from the data acquisition node 100. The GUI 725 associated with the global master unit 710 may include, for example, a graphically displayed panel menu that provides various input and selection features to enter data. Note that the user interface as utilized herein generally refers to a type of environment that represents programs, files, options and so forth by means of graphically display icons, menus, and dialog boxes on a screen. A user can interact with the user interface to select and activate such options by pointing and clicking with a user input device such as, for example, a touch screen, a Key board on the like. A particular item can function in the same manner to the user in all applications because the user interface provides standard software routines to handle these elements and reports the user's actions. Note that GUI 725 can be implemented utilizing a GUI such as the GUI 553 depicted in FIG. 8 and can be provided by a module, such as, for example, module 552.

The GUI 725 is the access point for the user to the data acquisition node network 100. The GUI 725 permit user to transmit control commands, manipulate configurations system-wide, chat with other users, access the data acquisition node data files, and view real-time data that can be utilized to gauge the status of a detector. Note that the system 700 may include multiple GUIs however; a single GUI can have master permissions which may be enforced by the global master unit 710. The GUI 725 with master permissions essentially possess read and write access while all other GUI are restricted to read only access. Note that the GUI 725 may be configured as C++ application connected through TCP/IP to the global master unit 710 or a web-based application which transmit requests using HTTP to the global master unit 710. It can be appreciated, however, that such embodiments can be implemented in the context of other systems. The master GUI 725 may configure the controller 730 and the storage controller 740 associated with the system 700. The master GUI 725 also transmits commands to every data acquisition node 100 associated with the system 700.

Figure 13:
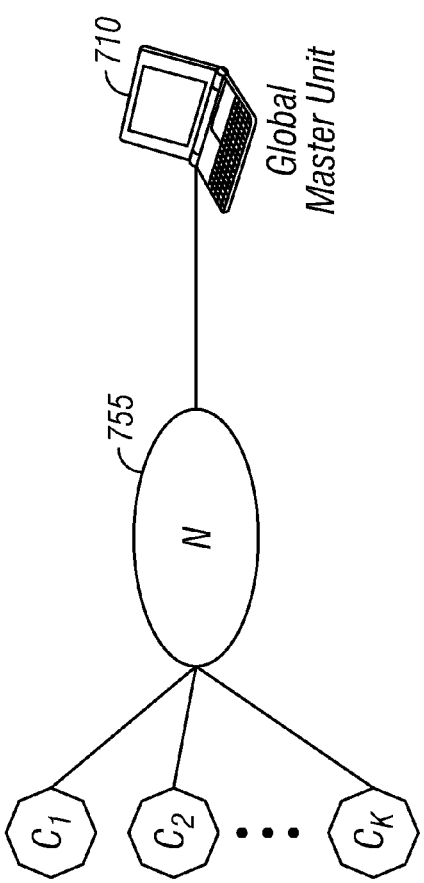
FIG. 13 illustrates a network topology associated with multiple data acquisition node and one master control unit, in accordance with the disclosed embodiments.

FIG. 13 illustrates a network topology 750 associated with multiple data acquisition node 100 and one global master unit 710, in accordance with the disclosed embodiments. Multiple data acquisition nodes 100 can be connected via a subnet master unit 755 and the global master unit 710 coordinates the nodes 100. The global master unit 710 is aware of all devices associated with the data acquisition node network topology 750. The global master unit 710 configures the subnet master unit 755 that functions as a web server for the graphical user interface 725.

Figure 14:
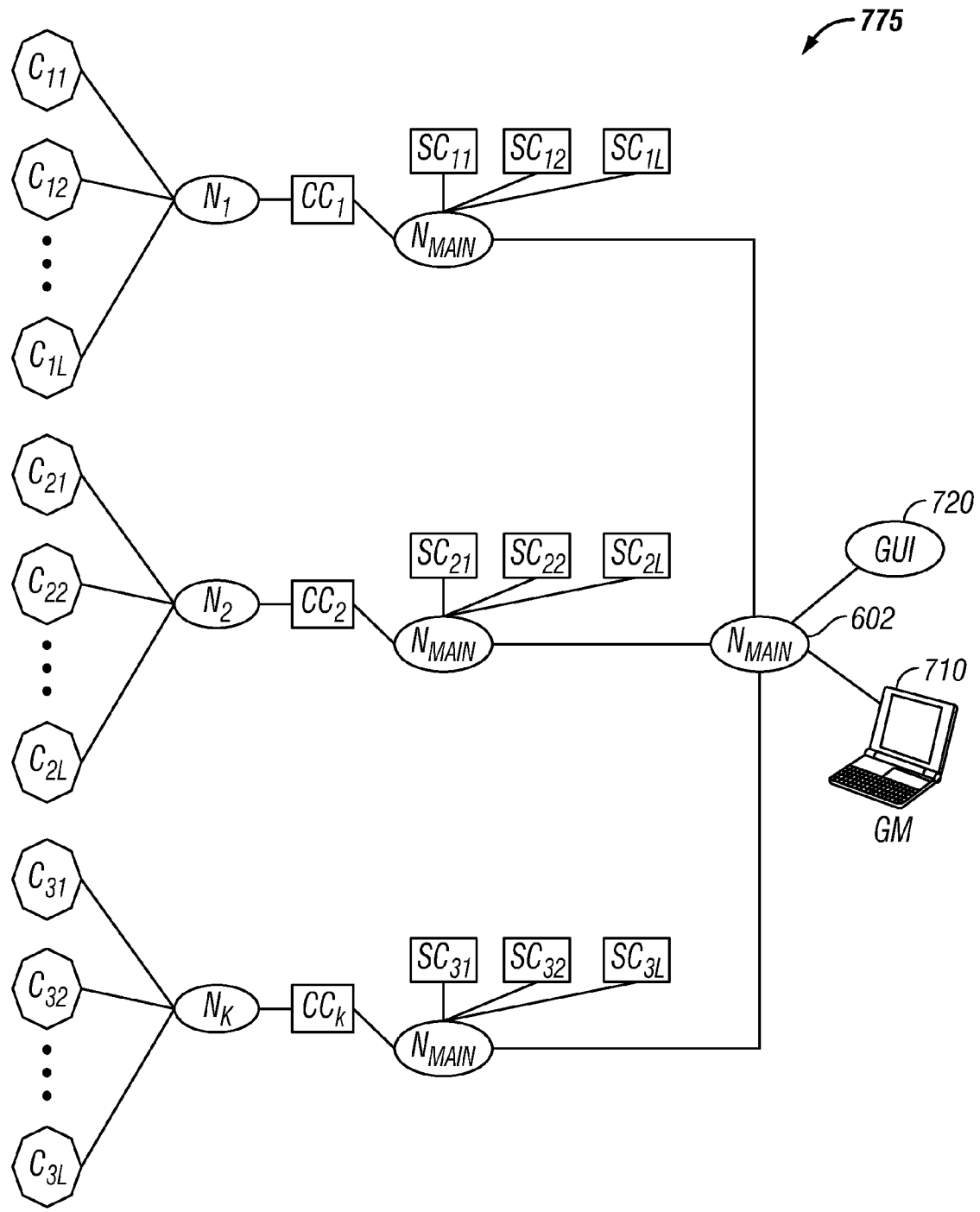
FIG. 14 illustrates a wide range of network topology supported by the data acquisition software system, in accordance with the disclosed embodiments.

FIG. 14 illustrates a wide range of network topology 775 supported by the data acquisition software system 700, in accordance with the disclosed embodiments. The multiple data acquisition node network topology 775 includes a number a subnet masters, such as, $N_1, N_2, \ldots,$ and $N_k$. The subnet masters may be configured with a number of data acquisition nodes 100. For example, the subnet master $N_1$ may be configured with data acquisition nodes $C_{11}, C_{12}, \ldots,$ and $C_{1l}$, the subnet master $N_2$ may be configured with data acquisition nodes $C_{21}, C_{22}, \ldots,$ and $C_{2l}$, the subnet master may be is configured with data acquisition nodes $C_{k1}, C_{k2}, \ldots,$ and $C_{kl}$. Each subnet master may be connected to the controller 730 which further communicate with the master network $N_{MAIN}$. For example, the subnet master $N_1$ is connected to the controller $CC_1$, the subnet master $N_2$ is connected to the controller $CC_2$ and the subnet master $N_k$ is connected to the controller $CC_k$. Each individual controller 730 in the network topology 775 may further communicate the data associated with such subnet masters to the network $N_{MAIN}$.

Figure 15:
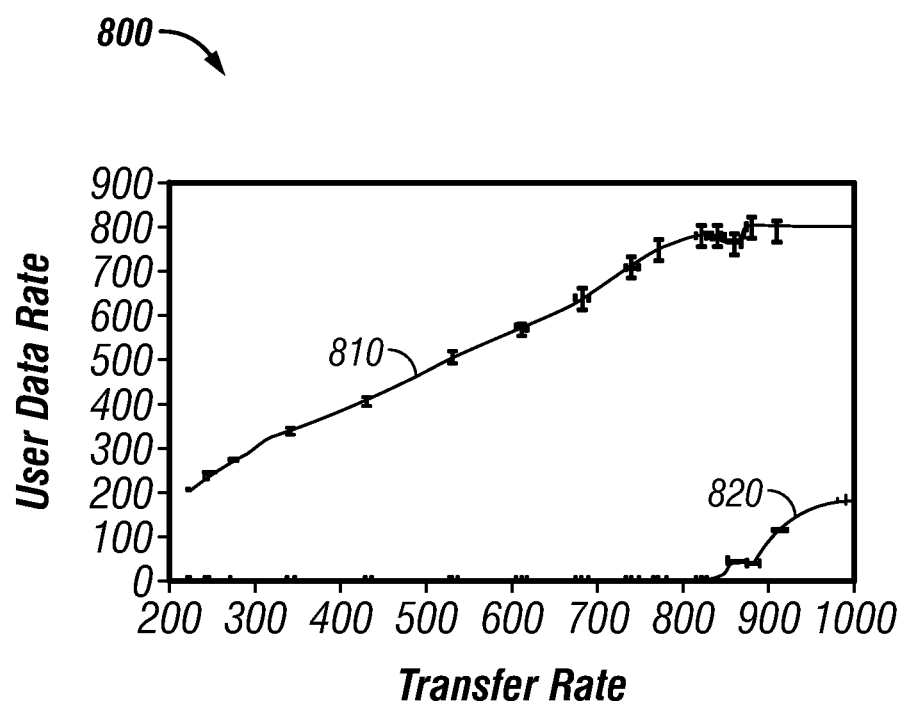
FIG. 15 illustrates a graph depicting data transfer with respect to a gigabit Ethernet link, in accordance with the disclosed embodiments.

The network $N_{MAIN}$ may store the acquired data into the storage unit 608 via the storage controller 740. The stored data files can be accessed by the user 720 via the global master unit 710 and the GUI 725. FIG. 15 illustrates a graph 800 depicting data transfer with respect to a gigabit Ethernet link, in accordance with the disclosed embodiments. The curve 810 represents data that is successfully transferred and the bottom curve 820 represents the lost data. As depicted in FIG. 15 the user can transfer information before the system starts to loose data utilizing the gigabit Ethernet link. The software implementation provides the user an option to maintain the same controls, acquisition, and analysis tools from a single unit test stand to final system production.

The flexibility, versatility and scalability of the data acquisition software system 700 provide multi-process and distributed computing techniques. The data acquisition software system 700 can handle multiple data acquisition nodes, each producing gigabits of data per second, thereby providing an option to employ distributed computing for data acquisition network topologies involving large amounts of data. The data acquisition node 100 can be employed in test beam and pixel detector tracking applications for high energy physics. The system 700 may also be deployed to implement diverse applications that range from detector test beam and test stand systems to multi-core DSP applications. The data acquisition software system 700 associated with the data acquisition node 100 provide a vibrant community of collaborators leading to an efficient reuse of development products.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:
1. A data acquisition system comprising:
a plurality of subnets comprising a plurality of data acquisition nodes;
a plurality of data acquisition sensors forming each data acquisition node of said plurality of data acquisition nodes wherein said each data acquisition node further comprises:
at least one primary board electronically coupled to the plurality of data acquisition sensors via a first bus to provide intra-node communication between said at least one primary board and said plurality of data acquisition sensors, wherein said at least one primary board further comprises a data conversion module to convert data associated with said plurality of data acquisition sensors;
a dedicated mass memory board integrated with and coupled to the plurality of data acquisition sensors to accept and store streaming sensor data;
an intra-node communications module configured to control intra-node bus communications between said plurality of data acquisition sensors and said dedicated mass memory board and to control storage of sensor data into the dedicated mass memory board; and,
a gigabit Ethernet module coupled to the intra-node communications module and the dedicated mass memory board to facilitate inter-node high speed communications between the data acquisition node and a plurality of other data acquisition nodes;
a subnet controller configured within each subnet of said plurality of subnets coupled to the gigabit Ethernet module of said each data acquisition node within a respective subnet of said plurality of subnets to control communications between the mass memory board, a graphical user interface and a remote database via the gigabit Ethernet module, the subnet controller module to communicate with said plurality of other data acquisition nodes and to accept and tag sensor data from the data acquisition node and from the other data acquisition nodes, the subnet controller configurable via the graphical user interface as a web server to serve the graphical user interface via a remote location and configurable to store data from the data acquisition node and from the other nodes in a remote database.

2. The system of claim 1 wherein said first bus further comprises at least one of the following:
a data bus;
a system bus; and
a power bus.

3. The system of claim 1 wherein said at least one primary board further comprises an optical bus that provides an open air intra-node connection between said plurality of data acquisition sensors.

4. The system of claim 1 wherein said at least one primary board further comprises a programmable node processing and control board to process information acquired from said plurality of data acquisition sensors.

5. The system of claim 1 wherein said at feast one primary board comprises a power supply module that generates regulated power to supply power lines associated with said data acquisition node.

6. The system of claim 1 further comprising a predetermined communications protocol comprising a universal datagram protocol.

7. The system of claim 1 further comprising a user interface module to communicate with a master control unit, wherein said user interface to displays data associated with information acquired by said plurality of data acquisition sensors and to facilitate the operation of a plurality of sensor nodes.

8. A data acquisition system, said system comprising:
a plurality of subnets comprising a plurality of data acquisition nodes;
a plurality of data acquisition sensors forming each data acquisition node of said plurality of data acquisition nodes wherein said each data acquisition node further comprises:
a mass memory board dedicated to and integrated with a plurality of data sensors;
at least one primary board having an intra-node controller module coupled to the plurality of data acquisition sensors and the mass memory board to provide intra-node communication control between at least one of said plurality of data acquisition sensors and said mass memory board, wherein said at least one primary board further comprises a data conversion module to adjust a gain and an offset of data acquired by said data acquisition sensors;
a subnet controller configured within each subnet of said plurality of subnets to facilitate communications between the mass memory board and other data acquisition nodes to communicate with said other data acquisition nodes via a predetermined communications protocol to facilitate exchange of information between said other nodes to thereby provide a distributed and expandable data acquisition system the subnet controller configurable to drive a user interface, from a remote location, wherein said user interface to display data indicative of information acquired by said plurality of data acquisition nodes, and wherein said at least one primary board further comprises a data conversion to convert data acquired by said plurality of data acquisition nodes; and
a gigabit Ethernet communications module coupled to the subnet controller and the mass memory board of each subnet of said plurality of subnets to facilitate inter-node high speed data communications.

9. A computer-implemented method of configuring a data acquisition system, said method comprising:
configuring a plurality of subnets comprising a plurality of data acquisition nodes;
configuring said plurality of data acquisition nodes, the plurality of data acquisition nodes having a plurality of sensors to communicate with a graphical user interface via a subnet controller configured within each subnet of said plurality of subnets wherein each data acquisition node includes an intra-node communications module to control communications between at least one subnet controller and said plurality of sensors wherein said each of said plurality of data acquisition nodes further comprises a data conversion module to adjust a gain and an offset of sensor data and a dedicated and integrated mass memory module coupled to the intra-node communications controller, to store sensor data;
configuring the subnet controller to facilitate serving of a remotely located graphical user interface and to facilitate inter-node communication among said plurality of data acquisition nodes; and
configuring the subnet controller to communicate with said plurality of data acquisition nodes via a predetermined communications protocol and permit subnet control and administration of sensor data acquisition and distribution from a node in the plurality of nodes to thereby provide distributed and expandable data acquisition and processing of streaming sensor data available via a distributed data acquisition system; and
a gigabit Ethernet communications module coupled to the subnet controller and the mass storage module to facilitate inter-node high speed communications to a graphical user interlace.

10. The method of claim 9 further comprising configuring a subnet module to communicate with selected nodes.

11. The method of claim 10 further comprising:
configuring said predetermined communications protocol to a universal datagram protocol.

12. The method of claim 10 further comprising:
configuring a master control unit to communicate with a plurality of subnets and to control storage of data associated with said plurality of data acquisition nodes in a remote database.

\* \* \* \* \*